United States Patent [19]

Srivastava

[11] Patent Number: 5,212,543

[45] Date of Patent: May 18, 1993

[54] VIDEO PROCESSOR HAVING REDUCED CAPACITY LUMINANCE DELAY CIRCUIT

[75] Inventor: Gopal K. Srivastava, Arlington Heights, Ill.

[73] Assignee: Zenith Electronics Corporation, Glenview, Ill.

[21] Appl. No.: 770,503

[22] Filed: Oct. 3, 1991

[51] Int. Cl.⁵ .......................... H04N 9/77; H04N 9/78
[52] U.S. Cl. ................................. 358/21 R; 358/31; 358/39; 358/40
[58] Field of Search ................. 358/21 R, 39, 31, 38, 358/40

[56] References Cited

U.S. PATENT DOCUMENTS

| | | | |
|---|---|---|---|
| 4,470,069 | 9/1984 | Lewis, Jr. | 358/31 |
| 5,045,929 | 9/1991 | Rabii | 358/31 |

FOREIGN PATENT DOCUMENTS

| | | | |
|---|---|---|---|
| 8400658 | 2/1984 | World Int. Prop. O. | 358/31 |
| 8400659 | 2/1984 | World Int. Prop. O. | 358/31 |

Primary Examiner—Tommy P. Chin

[57] ABSTRACT

A television receiver includes a frequency multiplexed video processor which processes chrominance and luminance signals in response to synchronously detected composite video information. The composite video signal is separated into a plurality of frequency spectra which are individually processed utilizing digital electronic circuitry to achieve high performance and cost effectiveness. A comb filter is operative within one of the processors to provide separation of the luminance and chrominance information within the chrominance signal bandpass to maintain high frequency luminance signal components. A separate processor and bandpass filter are operative to provide separate control of the luminance peaking within the system. Conventional luminance and chrominance processing converts the output signals of the multiplexed processor to RGB video signals which are applied to a conventional cathode ray tube display having a conventional deflection system associated therewith.

17 Claims, 3 Drawing Sheets

VIDEO PROCESSOR HAVING REDUCED CAPACITY LUMINANCE DELAY CIRCUIT

FIELD OF THE INVENTION

This invention relates generally to television receivers and particularly to the systems therein for processing luminance and chrominance information.

BACKGROUND OF THE INVENTION

Color television systems have been developed using several different broadcast and signal processing formats to achieve the successful transmission and reception of color television programming. While substantial differences between systems exist, they all must satisfy the basic objective of combining the picture or luminance information, the color or chrominance information, and sound information together with appropriate display scan synchronizing signals to form an information signal which may be modulated upon a carrier for transmission. At the receiver, the opposite processes must take place in which the several components of the information signal are separated and appropriately processed. In most television broadcast formats such as the NTSC system used within the United States of America and the PAL system used in many European countries, the signal components corresponding to luminance, chrominance and sound are distinguished from each other and separated for individual processing largely on the basis of signal frequencies. For example, in the NTSC system, the available broadcast bandwidth is maintained at 6 megahertz. To conserve channel bandwidth and still transmit a video signal up to 4.1 megahertz, a vestigial sideband format in which the carrier is off center within the 6 megahertz channel bandwidth is used. The chrominance information is modulated upon a chrominance subcarrier separated from the picture carrier by approximately 3.58 megahertz. The sound information is separated from the picture carrier by 4.5 megahertz.

Thus, the receiver is able to select the chrominance, sound and luminance signal portions by using appropriate frequency response networks or filters and thereafter perform individual processing thereon. Unfortunately, the frequency selection process used in most television receivers results in the loss of substantial amounts of information or image content. Perhaps the most notable loss occurs in the video or luminance information which is severely bandwidth limited as a result of the separation of chrominance and sound information. While these losses have been recognized as less than desirable, the basic filtering processes used in most television receivers has made improvement difficult or impractical. Many receivers use analog glass delay line comb filters to separate luminance and chrominance information in the shared frequency spectrum. Since glass delay lines do not provide accurate delay, factory alignments are needed to accurately separate luminance and chrominance signals.

One of the approaches contemplated by practitioners in the art seeking to improve the recovery of information at the receiver is found in the use of digital signal processing rather than the more pervasive presently used analog signal processing. Several advantages are provided by digital signal processing. For example, information processing techniques which require memory for temporary storage of information are facilitated in a digital environment due to the ease with which memory may be achieved. The combination of memory and the manner in which signals may be "clocked out" from them in digital systems make signal delays relatively easy to perform in a digital signal environment. Also, generally speaking, digital systems have evolved to a level of sophistication in which many digital systems have proven to be more economical to manufacture and have required fewer adjustments than their corresponding analog systems.

One portion of video processors which appears promising as an application of digital processing is the luminance signal delay. This need for luminance signal delay is well-known and arises due to the "slower" travel of the chrominance information through the narrow bandwidth chrominance channel relative to the "faster" travel of the luminance information through the wide bandwidth luminance channel. To make chrominance and luminance signals coincident the luminance is delayed.

The most common analog system for luminance delay makes use of either a transmission line of the necessary length or a lumped-constant approximation thereof. In either case, the input and output circuits of the delay element or "delay line" must provide a correct impedance match to avoid information loss or distortions such as transmission line "ringing".

In a digital system, however, signal delay may be obtained in a more straight-forward and reliable manner through the use of a memory which receives the to-be-delayed signal. Delay is obtained by controlling the timing of the clock signal which transfers the signal from the memory. Unfortunately, simply applying this straight-forward approach alone results in a prohibitively expensive and complex delay system.

To understand this, several fundamentals of digital signal processing systems must be recalled. For example, a fundamental bandwidth limitation is imposed upon digital processing circuits by the sample or clock rate which the system uses. Generally speaking, the sample or clock rate must be greater than twice the highest frequency signal component being processed. Unfortunately, the use of high frequency sample or clock rates often results in dramatically increased system complexity which in turn increases costs. Moreover, in broadcast formats such as the above-mentioned NTSC or PAL systems, the received information is analog information and thus the us of digital circuit processing thereon requires that the signals be converted from analog-to-digital signals. The signal must be bandwidth limited by a filter such that the highest frequency signal at the input of the analog-to-digital converter is less than half the sampling clock rate. The low pass filtering of the signal limits the high frequency components of the analog signal being converted. Avoiding such losses while processing high frequency information requires more complex (and costly) converters operated at high sample frequencies. In addition, due to higher sampling frequency, more samples require the delay which increases the amount of memory needed. Thus, the combination of long signal delay (large memory) and high clock frequency rates together with more complex high clock rate converters has, to date, made digital delay systems a high cost element of video processors.

There remains, therefore, a need in the art for a practical, cost-effective system which provides the advantages of digital electronic circuit processing for luminance delay while avoiding excessive costs and complexity.

Accordingly, it is a general object of the present invention to provide an improved video processor. It is a more particular object of the present invention to provide a cost effective digital luminance delay for use within a video processor.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
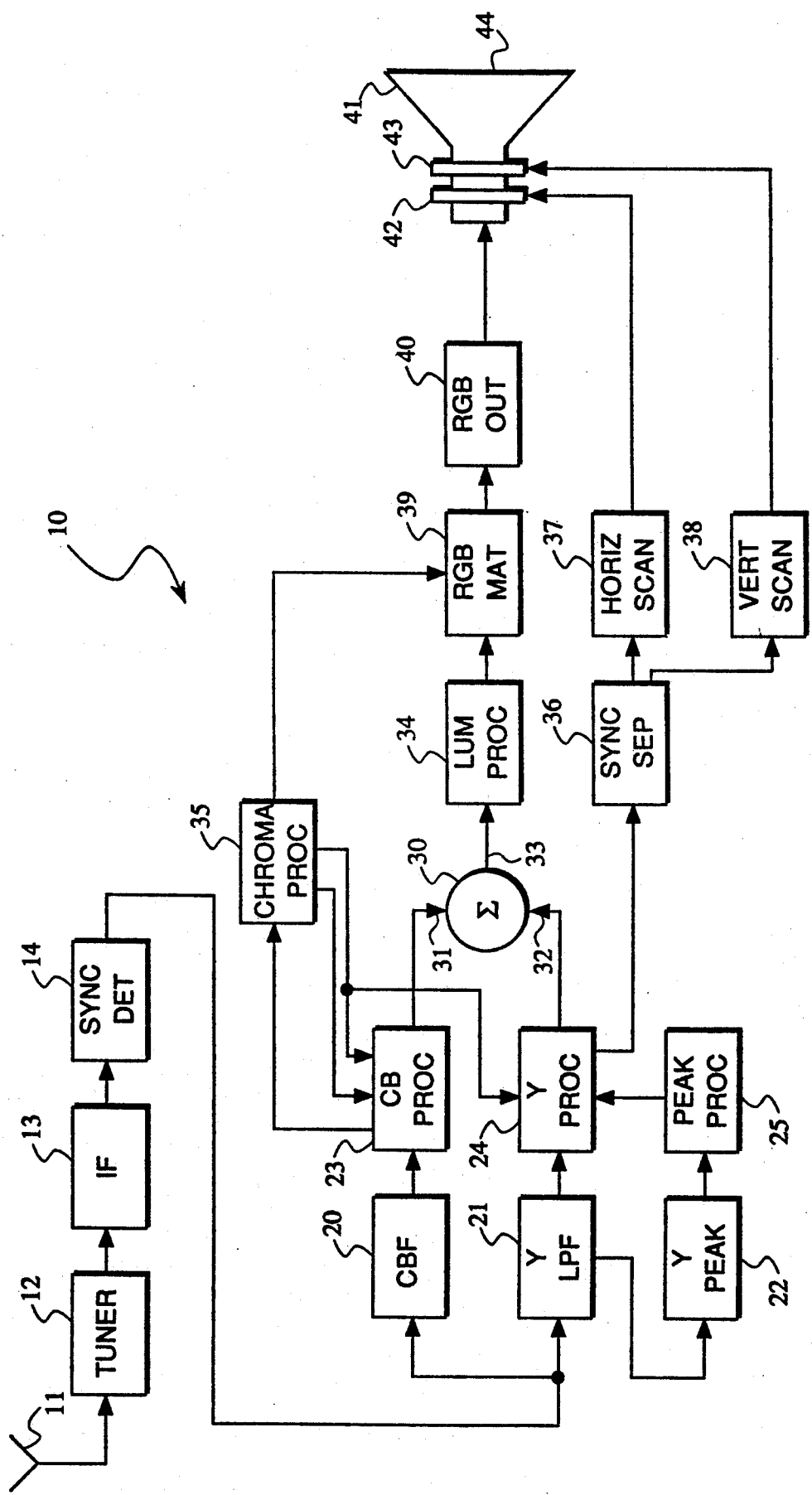
FIG. 1 sets forth a block diagram of a television receiver having a frequency multiplexed video processor and luminance delay circuit constructed in accordance with the present invention.

FIG. 1 sets forth a block diagram of a television receiver constructed in accordance with the present invention and generally referenced by numeral 10. Receiver 10 includes an antenna 11 coupled to a tuner 12. The output of tuner 12 is coupled to an intermediate frequency amplifier 13 which in turn is coupled to a synchronous detector 14. The output of synchronous detector 14 is coupled to frequency selective filters 20 and 21. Filter 21 is further coupled to a filter 22. The output of filter 20 is coupled to a signal processor 23 while the outputs of filters 21 and 22 are coupled to respective signal processors 24 and 25. The output of signal processor 25 is coupled to signal processor 24. Signal processor 23 is coupled to a chrominance processor 35. A summing network 30 includes a pair of inputs 31 and 32 coupled to the outputs of processors 23 and 24 respectively. Summing network 30 further includes an output 33 coupled to the input of a luminance signal processor 34. The latter is coupled to a RGB matrix 39. The output of chrominance processor 35 is also coupled to RGB matrix 39. The output of RGB matrix 39 is coupled to an RGB output circuit 40.

A cathode ray tube 41, constructed in accordance with conventional fabrication techniques, includes a display screen 44 an is coupled to RGB output circuit 40. Cathode ray tube 41 further includes a horizontal deflection yoke 42 and a vertical deflection yoke 43.

Signal processor 24 includes an output coupled to a sync separator 36 which in turn is coupled to a horizontal scan system 37 and a vertical scan system 38. Horizontal scan system 37 is coupled to horizontal yoke 42 while vertical scan system 38 is coupled to vertical deflection yoke 43.

In operation, antenna 11, tuner 12, intermediate frequency amplifier 13 and synchronous detector 14 function in accordance with conventional television system practice to receive a transmitted television signal which is selected by tuner 12 and amplified by intermediate frequency amplifier 13 to a level sufficient to facilitate the operation of synchronous detector 14. The latter performs a synchronous detection process in which the composite video signal which includes the luminance and chrominance as well as the horizontal and vertical synchronizing signals is recovered from the intermediate frequency carrier at the input to synchronous detector 14.

Figure 2:
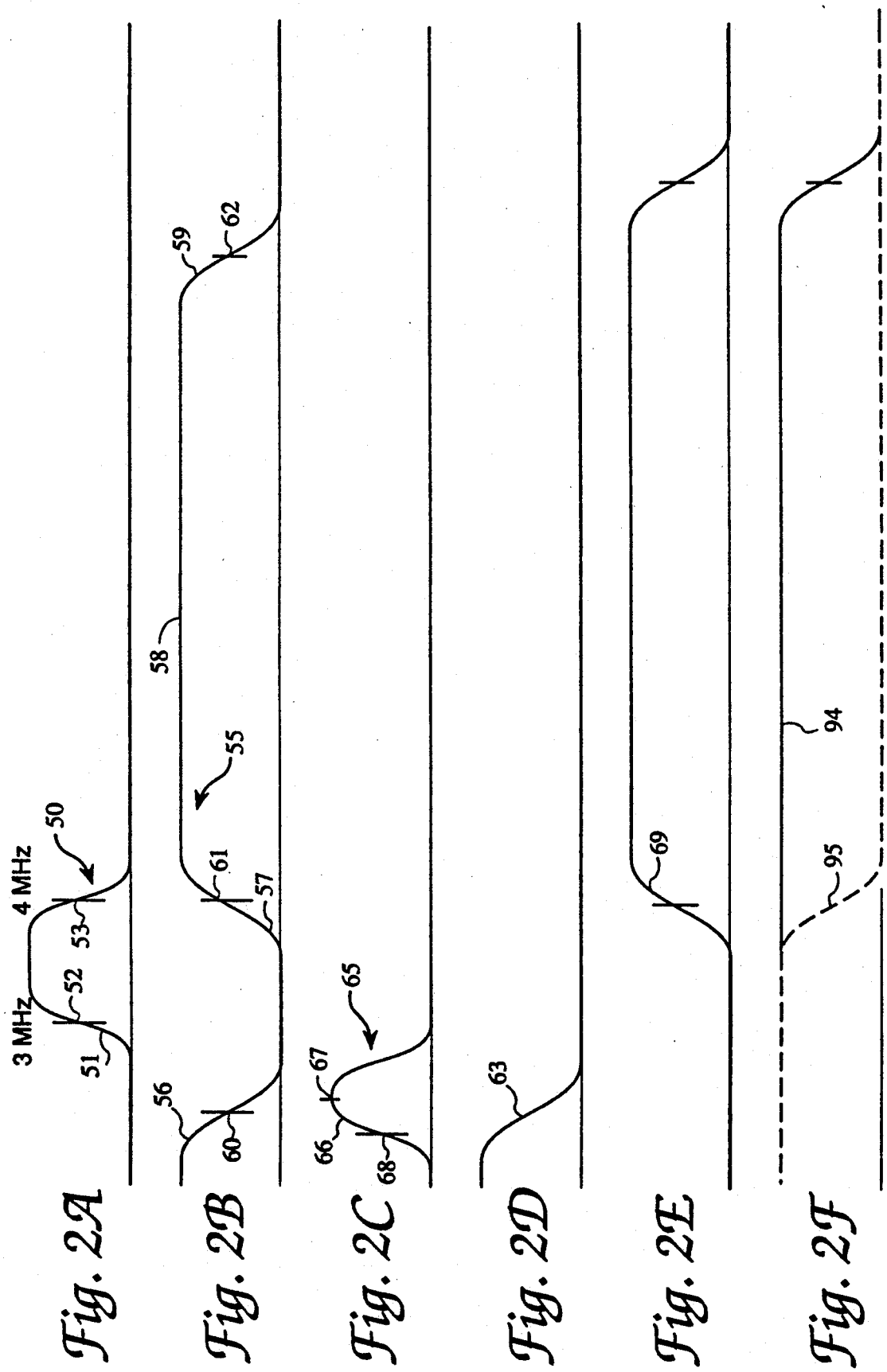
FIGS. 2A through 2F set forth frequency response curves of several portions of the present invention frequency multiplexed video processor and luminance delay circuit.

The composite video signal recovered by synchronous detector 14 is applied to filters 20 and 21 and from the latter to filter 22. The frequency responses of filters 20 through 22 are set forth in FIG. 2. With temporary reference to FIGS. 1 and 2 together, FIG. 2A sets forth the response of filter 20 which, in essence, comprises a chrominance signal bandpass filter for an NTSC receiver generally referenced by numeral 50. Thus, frequency response curve 50 defines a passband 51 which is generally centered at the chrominance subcarrier frequency of 3.58 megahertz and which is approximately 1 megahertz wide at the 6 db or "half points" 52 and 53. It will be apparent to those skilled in the art that filter 20 excludes all information within the composite video signal except for the portions thereof having frequencies within response curve 50. In a similar fashion, filter 21 defines a frequency response set forth in FIG. 2B and generally referenced by numeral 55. Response curve 55 defines extended regions 56 and 58 which are pass regions separated by a notch 57 therebetween. Notch 57 is generally coincident with the passband of curves 50 and 65. The 6 db or half points 60 and 61 generally coincide with 6 db points 68 and 53 of curves 67 and 50 in FIGS. 2A and 2C respectively. The upper frequency region of response curve 55 defines a slope 59 having a 6 db point 62 at approximately 10 megahertz. Thus, the response curve of filter 21 shown in FIG. 2B essentially passes all frequency components of the composite video signal with the exception of the chrominance bandpass and luminance peaking components. It should also be noted that frequency response 55 of filter 21 is configured to accommodate both NTSC and the newly emerging high definition video signal sources. Accordingly, when used in an NTSC broadcast environment, it will be apparent that very little, if any, luminance information will be contained in the extended frequency portion 58 of curve 55 beyond notch 57.

FIG. 2C sets forth the frequency response of filter 22 generally referenced by numeral 65. As can be seen, response curve 65 shows that filter 22 excludes all frequencies with the exception of a relatively narrow passband 66. Passband 66 is centered at a center frequency 67 which, in the present application, is selected to be 2.5 megahertz. The bandwidth and center frequency of bandpass 66 is, to some extent, a matter of design choice and, as is described below in greater detail, is selected to embrace the portion of the luminance signal which benefits the most from luminance or video peaking processes. It has been found advantageous in the present system to utilize a bandwidth of approximately one-half megahertz for bandpass 66.

Returning to FIG. 1, the filtered output signals of filters 20, 21 and 22 are coupled to a corresponding trio of signal processors 23, 24 and 25 respectively. The operations of processors 23, 24 and 25 are set forth below in greater detail. However, suffice it to note here that processor 23 receives both chrominance and luminance signals within the 3 to 4 megahertz frequency bandwidth and as a result includes the color burst and chrominance signals together with 3 to 4 megahertz frequency luminance information. As is also set forth below in greater detail, processor 23 is operative upon the applied signal to perform a separation of the chrominance information from the luminance information and to perform the automatic chromacontrol, or ACC, function upon the chrominance signal components. The chrominance signal is applied to chrominance processor 35. Concurrently, the luminance signal components separated from the chrominance signal components are coupled to a summing network 30 at input 31. As will be also be described below in greater detail, the operation of processor 23 utilizes advantageous digital processing techniques such as digital comb filtering to efficiently recover the chrominance information without sacrificing the important high frequency luminance information in the 3 to 4 megahertz band which in many prior art television receivers is lost.

Processor 24 essentially processes all of the luminance information with the exception of signal components within the chrominance bandwidth processed by processor 23. Accordingly, processor 24 may be thought of as the primary or main luminance signal processor. It should also be noted that the bandwidth of processor 23 is substantially less than that of processor 24. Thus, the chrominance signals at the output of processor 23 are delayed with respect to the luminance signals at the output of processor 24. To compensate for this delay, processor 24 utilizes digital circuitry including a digital delay element (described below) to provide a precise luminance delay network and further signal filtering. As is also described below in greater detail, processor 24 additionally performs the important function of providing a video clamping level. The output of processor 24 which includes luminance information having frequencies from 0 to 3 megahertz and from 4 to 11 megahertz and which is free of any chrominance information is coupled to input 32 of summing network 30.

Processor 25 is configured to provide supplemental luminance signal processing and is intended to provide the desired luminance signal peaking. The operation of processor 25, therefore, is extremely important to the overall quality and appeal of the displayed image of receiver 10. As is known, the use of luminance signal peaking techniques in which the luminance signal components at significant transition points are emphasized enhances the displayed image. Essentially, the operations of peaking systems provide emphasized preshoot and overshoot components adjacent the luminance signal transitions to sharpen the displayed image and provide a "crisper" display. Processor 25 performs this function in the manner set forth below by separately amplifying the luminance signal components used in luminance peaking. This enhanced peaking signal is coupled to processor 24 and, in the manner set forth below in greater detail, is combined with the luminance signal processed thereby.

Summing network 30 combines the luminance information from processors 23 and 24 to provide a full spectrum luminance signal at output 33 which is applied to luminance processor 34. It should be note that the frequency multiplexing of the system shown in FIG. 1 provides for complete recovery of the entire spectrum of luminance frequencies while nonetheless efficiently separating the chrominance signal. In addition, the separation and processing of the peaking frequency luminance signal components for supplemental amplification provides improved image enhancement due to higher quality luminance peaking. Luminance processor 34 provides further amplification of the luminance signal for application to RGB matrix 39.

Similarly, chrominance processor 35 is operative in accordance with conventional receiver techniques to recover the color difference signals from the chrominance input from processor 23. The output color difference signals from processor 35 are also applied to RGB matrix 39. Matrix 39 is constructed in accordance with conventional fabrication techniques and, in essence, combines the color difference signals from chrominance processor 35 with the luminance signal from processor 34 to produce RGB color video signals. The production of correct RGB color video signals requires the proper timing between color difference and luminance signals provided by the luminance delay within processor 24 and described below. The RGB color video signals are amplified by output amplifier 40 and applied to cathode ray tube 41 in further accordance with conventional processing techniques.

Sync separator 36 receives a luminance signal output from processor 24 and separates the horizontal and vertical scan synchronizing signals therefrom which are used to synchronize the operations of horizontal and vertical scan systems 37 and 38 and provide energizing signals for horizontal and vertical yokes 42 and 43 respectively.

Figure 3:
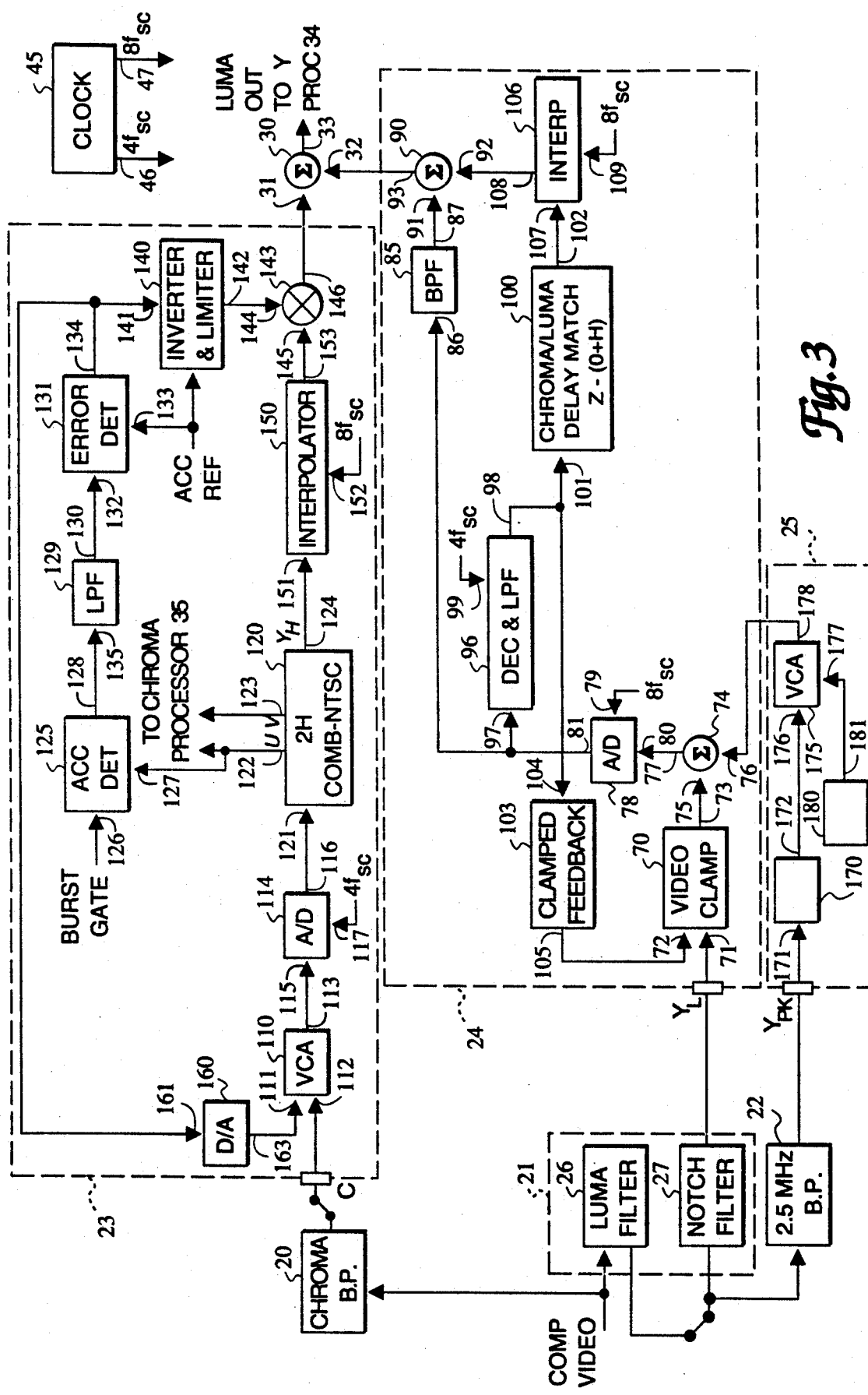
FIG. 3 sets forth a block diagram of the present invention frequency multiplexed video processor and luminance delay circuit.

FIG. 3 sets forth a detailed block diagram of processors 23, 24 and 25 constructed in accordance with the present invention. Also shown in FIG. 3 are input filters 20, 21 and 22. As mentioned above in FIG. 1, the composite video output signal from synchronous detector 14 which includes luminance, chrominance and synchronizing information signals is applied commonly to filters 20 and 21. Filter 21 includes two filter stages 26 and 27 serially coupled between synchronous detector 14 (shown in FIG. 1) and processor 24 and defines the above-mentioned frequency response shown in FIG. 2B which generally excludes chrominance and luminance peaking information. The output of luminance filter 26 is substantially free of chrominance information and is coupled to a notch filter 27 and filter 22. Notch filter 27 defines a complimentary response to bandpass filter 22.

Processor 24 includes a video clamp circuit 70 having an input 71 coupled to notch filter 27, an input 72, and an output 73. The latter is coupled to an input 75 of a summing network 74. An analog-to-digital converter 79 includes an input 80 coupled to output 77 of summer 74 and an output 78. A bandpass filter 85, having a frequency response set forth in FIG. 2E, includes an input 86 coupled to output 81 of analog-to-digital converter 78 and an output 87 coupled to input 91 of a summing network 90. A clamp feedback circuit 103 includes an input 104 coupled to output 98 of decimator low pass filter 96 and an output 105 coupled to input 72 of video clamp 70. Decimator and low pass filter 96 includes an input 97 coupled to output 81 of analog-to-digital converter 78, and an output 98. In accordance with the invention, a source of clock signal 45 is coupled to a clock input 99 of decimator 96. A delay line and impedance matching network 100 includes an input 101 coupled to output 98 of decimator and low pass filter 96 and an output 102. A digital interpolator 106 includes an input 107 coupled to output 102 of delay line 100 and output 108 coupled to input 92 of summing network 90. The summing network 90 includes an output 93 coupled to input 32 of summing network 30. In accordance with the present invention, interpolator 106 also includes a clock signal input 109 coupled to a source of clock signal 45.

Processor 23 includes a gain controlled amplifier 110 having an input 112 coupled to filter 20, a control signal input 111, and an output 113. An analog-to-digital converter 114 includes an input 115 coupled to output 113 of amplifier 110, a clock signal input 117 coupled to a clock signal source 45 and an output 116. An NTSC comb filter 120 includes an input 121 coupled to output 116 of analog to digital converter 114, a pair of chrominance signal outputs 122 and 123, and a luminance signal output 124. A digital interpolator 150 includes an input 151 coupled to luminance output 124 of comb filter 120, a clock signal input 152 coupled to a clock signal source 45, and an output 153. The latter is coupled to an input 145 of a multiplier 143. Multiplier 143 further includes an input 144 and an output 146 with the latter being coupled to input 31 of summing network 30. An automatic chrominance control detector 125 includes an input 126 coupled to a source of burst gating pulse (not shown), an input 127 coupled to output 122 of comb filter 120, and an output 128. A low pass filter 129 includes an input 135 coupled to output 128 of detector 125 and an output 130. An error detector 131 includes an input 132 coupled to output 130 Of filter 129, a reference input 133 coupled to a source of ACC reference potential (not shown), and an output 134. An inverter and limiting circuit 140 includes an input 141 coupled to output 134 and an output 142 coupled to input 144 of summing network 143. A digital-to-analog converter 160 includes an input 161 coupled to output 134 of error detector 131 and an output 163 coupled to control input 111 of gain controlled amplifier 110.

Processor 25 includes a gain controlled amplifier 175 having an input 176 coupled to filter 22, a gain control input 177, and an output 178 coupled to input 76 of summing network 74. A source of gain control voltage 180 includes an output 181 coupled to gain control input 177 of gain controlled amplifier 175.

In operation and by way of overview, the circuit of FIG. 3 provides frequency multiplexed luminance and chrominance processing in which processor 24 may be regarded as the primary luminance signal processor. In accordance with an important aspect of the present invention, the combination of decimator and low pass filter 96 and interpolator 106 within processor 24 facilitate the use of a reduced size or capacity delay circuit for delay 100 resulting in improved economy. Processor 23 processes the chrominance portion of the applied composite video signal together with the luminance signal components found within the frequency bandwidth of the chrominance signal. Finally, processor 25 is dedicated to the separate processing of the luminance signal components which correspond to luminance transition peaking and thus, the emphasis thereof may be independently controlled without upsetting the characteristics of the remaining luminance signal component processing.

With respect to the operation of processor 24, it should be recalled that the composite video signal applied to filter 21 is subjected to the frequency response of filter 21 which includes filter sections 26 and 27. As a result, the signal applied to clamp circuit 70 has a frequency characteristic shown in FIG. 2B as curve 55 which may be generally characterized as the luminance signal frequencies above and below the chrominance bandpass frequency together with the scan synchronizing signals. Notch filter 27 provides attenuation of signal components at 2.5 megahertz. Since the signal at input 71 does not contain chrominance signal, it is also free of burst signal. The removal of burst signal from the blanking pulse permits video clamp 70 to operate in a more efficient manner in establishing the appropriate reference level for the luminance signal. The clamping level is established by a digitally encoded reference signal provided by clamped feedback circuit 103 and applied to input 72 of clamp 70. Thus, in response to the applied digitally encoded reference signal, the DC level of the blanking signal within the scan retrace interval is established within clamp 70. Concurrently, blanking pulse clamping establishes the appropriate DC component of the luminance signal.

Filter 22 couples the luminance peaking signal components from the output of filter 26 to gain controlled amplifier 175 where it is amplified in accordance with a gain control voltage provided by peaking control 180. Control 180, in its simplest form, may comprise a consumer adjustable DC control which establishes the desired peaking signal amplitude and "sharpness" of the displayed image. The clamped luminance signal from clamp 70 is combined with the enhanced peaking signal from amplifier 175 by summing network 74 and converted from an analog signal to a digitally encoded signal by converter 78. To maintain the maximum amount of the all-important high frequency luminance signal components within the converted signal, analog-to-digital converter 78 is operated in response to a clock signal input having a high frequency.

While the frequency of clock signal used is, to some extent, a matter of design choice, it has been found convenient in the present system to utilize clock signals having frequencies which are multiples of the chrominance subcarrier. It has also been found that substantial economy may be achieved, without significant sacrifice of performance, if some digital systems are clocked at higher frequencies while others are clocked at lower frequencies. Accordingly, clock signals are provided at eight times the chrominance subcarrier and four times the chrominance subcarrier. To maximize the high frequency response of the digital signal produced by converter 78, a clock signal at eight times the chrominance subcarrier is used therein. The digital output signal of converter 78 is processed by a digital decimator and low pass filter 96 having a frequency response corresponding generally to response curve 63 in FIG. 2D. In accordance with an important aspect of the present invention, decimator 96 is clocked at the lower clock frequency (four times the chrominance subcarrier) rather than the higher clock frequency (eight times the chrominance subcarrier) used by converter 78. Because decimator 96 is processing lower frequency luminance signals, very little information is lost due to this lower clock rate. However, the use of a lower clock signal frequency for the input to delay circuit 100 reduces its size and capacity requirements and greatly lowers its cost. The low frequency signal components processed by decimator and low pass filter 96 are applied to a digital delay and impedance matching network 100 and to clamp feedback circuit 103. The latter processes the digitally encoded low frequency luminance signals to provide a DC feedback input for clamp 70 while the former provides a luminance signal delay.

As mentioned above, the delay of luminance signal is well-known and is required in receivers such as receiver 10 to compensate for the delays associated with the narrow band processing of the chrominance signal and luminance signal within the chrominance band. Furthermore, the luminance information from 2H comb filter 120 is delayed by one horizontal scan line. Accordingly, delay network 100 provides one line delay and an additional smaller delay to match the luminance and chrominance signals in the displayed image and enhance overall image quality. The size of the delay network is a function of the number of samples in one delay period. It has been found that one line delay mismatch of luminance signals of frequencies higher than 4 megahertz, is tolerable. Therefore, luminance signals within the frequency band shown in FIG. 2E need not be delayed. The luminance signal from analog-to-digital converter 78 is filtered to extract low frequency luminance signals having frequency band shown by FIG. 2D. The low frequency luminance signal is then applied to the decimator to reduce the number of samples in the delay period. The low frequency luminance signal is delayed by delay circuit 100 and then the delayed signal's data rate is upconverted by interpolator 106 so that it may be added to the higher data rate signal from bandpass filter 85.

Because the delayed luminance signal output of interpolator 106 is clocked at the higher clock frequency by interpolator 106, it is compatible with converter 78 and may be added to the remainder of the luminance signal filtered by bandpass filter 85 within summing network 90. Bandpass filter 85 defines a frequency characteristic corresponding to response curve 69 in FIG. 2E and is operative to exclude the low frequency video components selected by decimator and low pass filter 96. This exclusion of lower frequency luminance components is necessary to ensure that all low frequency luminance signal components within the output of processor 24 are subjected to the delay within delay network 100. In addition, it should be noted that the input signals to summing network 90 are digitally encoded signals. Thus, summing network 90 should be understood to include a conventional digital signal adder. The digitally encoded combined signal at the output of summing network 90 is applied to summing network 30 which also comprises a digital signal adder. Thus, processor 24 provides the all important luminance processing operations of proper video clamping together with the imposition of a precise luminance signal delay while maintaining the frequency response shown in FIG. 2B. As a result, the output signal of processor 24 maintains all of the luminance signal components of the input signal within the response shown in FIG. 2B and further includes the enhanced or emphasized luminance peaking signals provided by processor 25. In essence, then, the output signal of processor 24 includes all luminance signals but for those falling within the chrominance signal bandwidth. One important function of processor 23 is to provide the remaining luminance components to complete the luminance signal and provide a full spectrum response.

Turning now to the operation of processor 23, it should be recalled that the input signal to processor 23 comprises the composite video signal from synchronous detector 14 filtered by bandpass filter 20 in accordance with the frequency response shown in FIG. 2A. Thus, the input signal to gain controlled amplifier 110 includes the chrominance and luminance signal information falling within the bandpass shown in FIG. 2A. As is described below in greater detail, gain controlled amplifier 110 has a variable signal gain which, in essence, operates to maintain a constant signal output level for processor 23. Thus, gain controlled amplifier 110 amplifies the applied luminance and chrominance signals and couples them to analog-to-digital converter 114. The signal applied to converter 114 does not include the higher frequency signal components which are applied to converter 78 within processor 24. As a result, a lower frequency clock signal (four times the chrominance subcarrier) may be utilized which permits the use of smaller size delay elements used in the 2H comb filter. Converter 114 operates in accordance with conventional processes to convert the applied analog signal to a corresponding digitally encoded signal which is applied to comb filter 120. It should be recalled that the digitally encoded signal at the output of converter 114 includes both chrominance and luminance signals within the bandpass response of filter 20. Comb filter 120 comprises a digital comb filter which is extremely efficient at separating the luminance and chrominance information from the applied input without sacrificing the important luminance components. As a result, substantial advantage in the efficiency and effectiveness of the present invention system is achieved by the use of digitally encoded signal processing within processor 23. The separated chrominance signal components are coupled to chrominance processor 35 as described above.

It should be noted that while considerable reduction of complexity and economy is realized due to frequency multiplexing which permits a lower frequency narrow band video signal to be processed by the 2H comb filter. This lower frequency signal is sampled by lower sampled rate clock thus requiring smaller size delay element in the 2H comb filter. To facilitate the combination of the lower clock rate luminance signal output of comb filter 120 with the higher clock rate luminance signal provided by processor 24, interpolator 150 is interposed between the luminance signal output of comb filter 120 and summing network 30. Thus, interpolator 150 is operative in response to the same clock signal input utilized by analog-to-digital converter 78 within processor 24. Interpolator 150 functions in accordance with conventional fabrication techniques to convert the slower clock signal output of comb filter 120 to the higher clock signal rate or data rate of the applied clock signal at input 152 thereof. The use of lower frequency converter 114 and interpolator 150 achieves an overall economic advantage in that the memory required for comb filter 120 is directly related to the clock frequency used due to the corresponding number of samples in each horizontal line of signal processed.

The chrominance output signal of comb filter 120 is further processed by a conventional automatic chrominance control, or ACC, loop formed by ACC detector 125, low pass filter 129 and error detector 131. In accordance with conventional processing techniques, the burst gate pulse applied to detector 125 permits the separation of the reference chrominance signal burst from the remainder of the signal which is then amplitude detected by detector 125 and averaged by low pass filter 129 and compared to a predetermined reference number by detector 131. The output of detector 131 is an amplitude correction signal which is fed back to voltage controlled amplifier 110 through a digital-to-analog converter 160. The use of digital-to-analog converter 160 is required because voltage controlled amplifier 110 is an analog device which responds to an input analog control signal. The resulting operation of the control loop thus formed maintains a substantially constant chrominance signal output level for use by chrominance processor 35.

As a consequence of the operation of the automatic chrominance control or ACC loop within processor 23, a correspondingly constant amplitude is maintained for the luminance signal components which are concurrently amplified by gain controlled amplifier 110. A final correction in the amplitude of the luminance signal from processor 23 is provided to compensate for the loss created within the ACC loop by digital-to-analog converter 160. But for this correction which is provided by inverter and limiter 140, the luminance signal output of interpolator 150 would be subject to an offset or amplitude error. The luminance signal output of interpolator 150 together with this offset compensating signal from inverter 140 are combined in digital multiplier 143 which provides an amplitude corrected signal applied to summing network 30. Summing network 30 is also a digital adder combining the luminance signal outputs of processors 23 and 24 to provide a full spectrum luminance signal output which is coupled to luminance processor 34 (seen in FIG. 1).

It will be apparent to those skilled in the art that the present invention system shown in FIG. 3 provides substantial advantages over the prior art systems. The frequency separation within processor 24 between low frequency luminance and high frequency luminance components permits the use of a lower clock frequency decimator and higher clock frequency interpolator to employ a reduced capacity delay, efficient and effective digital delay line without sacrificing high frequency signal response. In addition and in accordance with a further important advantage of the present invention system, the frequency separation of the luminance signal within processor 24 which, in effect, causes the higher frequency luminance information to "by pass" the delay circuit and its limited bandwidth makes the present invention system fully capable of providing the full spectrum response required by the newly emerging high definition television systems.

What has been shown is a cost effective, efficient and high performance video processor for use in a television receiver, computer monitor or other similar processing system. The system utilizes a combination of frequency multiplexing together with sophisticated and cost effective digital electronic circuit processing techniques to provide a high performance processor at a cost effective price.

While particular embodiments of the invention have been shown and described, it will be obvious to those skilled in the art that changes and modifications may be made without departing from the invention in its broader aspects. Therefore, the aim in the appended claims is to cove all such changes and modifications as fall within the true spirit and scope of the invention.

That which is claimed is:

1. For use in an image display system responsive to a composite video signal having chrominance and luminance information, video processing means comprising:
   receiving means for receiving said composite video signal;
   separating means for separating said luminance information from said chrominance information to provide a luminance signal;
   signal means for processing said luminance signal to produce a lower frequency portion digital signal clocked at a low frequency and a higher frequency portion digital signal clocked at a high frequency;
   delay means for delaying said lower frequency portion digital signal to produce a delayed lower frequency portion digital signal;
   converting means for converting said delayed lower frequency portion digital signal to a high frequency clocked delayed lower frequency portion digital signal; and
   combining means for combining said higher frequency portion digital signal and said high frequency clocked delayed lower frequency portion digital signal.

2. Video processing means as set forth in claim 1 wherein said signal means includes:
   analog-to-digital converting means for converting said luminance signal to a digital luminance signal clocked at said high frequency;
   frequency dividing means for dividing said digital luminance signal into said lower frequency portion digital signal and said higher frequency portion digital signal; and
   decimator means for converting said lower frequency portion digital signal to said lower frequency portion digital signal clocked at said low frequency.

3. Video processing means as set forth in claim 2 wherein said decimator means includes:
   means for applying said lower frequency portion digital signal to a decimator circuit; and
   means for clocking said decimator circuit at said low clock frequency.

4. Video processing means as set forth in claim 3 wherein said converting means includes:
   means for applying said delayed lower frequency portion signal to an interpolator; and
   means for clocking said interpolator at said In high clock frequency.

5. Video processing means as set forth in claim 4 wherein said frequency dividing means includes:
   a digital signal low pass filter filtering said digital luminance signal; and
   a digital signal bandpass filter filtering said digital luminance signal.

6. Video processing means as set forth in claim 5 wherein said combining means include a digital adder for adding said higher frequency and lower frequency portion signals.

7. Video processing means as set forth in claim 6 wherein said analog-to-digital converting means includes:
   an analog-to-digital converter having a clock signal input; and
   means for clocking said analog-to-digital converter at said high clock frequency coupled to said clock signal inputs.

8. For use in an image display system responsive to a composite video signal having chrominance and luminance information, a video processing method comprising the steps of:
   receiving said composite video signal;
   separating said luminance information from said chrominance information to provide a luminance signal;
   processing said luminance signal to produce a lower frequency portion digital signal clocked at a low frequency and a higher frequency portion digital signal clocked at a high clock frequency;
   delaying said lower frequency portion digital signal to produce a delayed lower frequency portion digital signal;

converting said delayed lower frequency portion digital signal to a high frequency clocked signal; and combining said higher frequency and lower frequency portion digital signals.

9. The method set forth in claim 8 wherein said processing step includes the steps of:

converting said luminance signal to a digital luminance signal clocked at said high clock frequency;

dividing said digital luminance signal into said lower frequency portion digital signal and said higher frequency portion digital signal; and converting said lower frequency portion digital signal to said lower frequency portion digital signal clocked at said low frequency.

10. The method set forth in claim 9 wherein said step of converting said lower frequency portion digital signal includes the steps of:

applying said lower frequency portion digital signal to a decimator; and clocking said decimator at said lower frequency.

11. The method set forth in claim 10 wherein said step of converting said delayed lower frequency portion signal includes the steps of:

applying said delayed lower frequency portion signal to an interpolator; and clocking said interpolator at said high clock frequency.

12. The method set forth in claim 11 wherein said step of dividing said digital luminance signal includes the steps of:

low pass filtering said digital luminance signal through a digital signal low pass filter; and high frequency filtering said digital luminance signal through a digital signal bandpass filter.

13. The method set forth in claim 12 wherein said combining step includes the step of adding said higher frequency and lower frequency portion signals in a digital signal adder.

14. The method set forth in claim 13 wherein said step of converting said luminance signal includes the steps of:

applying said luminance signal to an analog-to-digital converter; and clocking said analog-to-digital converter at said high frequency.

15. For use in an image display system responsive to a composite video signal and having a high frequency clock signal source and a low frequency clock signal source, video processing means comprising:

means for receiving a composite video signal having luminance information and chrominance information;

means for frequency dividing said composite video signal into a chrominance band signal and a luminance band signal;

first processor means for processing said chrominance band signal to separate luminance and chrominance information within said chrominance band signal;

chrominance processor means for demodulating said chrominance information to produce color signals;

second processor means for processing said luminance band signal having means for separating said luminance band signal into a lower frequency portion and a higher frequency portion, delay means for establishing a predetermined luminance delay in said low frequency portion of said luminance band signal with respect to said higher frequency portion, decimator means for converting said lower frequency portion to a lower frequency clocked signal before said delay means and interpolator means for converting said delayed lower frequency portion to a high frequency clocked signal;

means for combining said luminance information within said chrominance band signal and said luminance band signal to form a full-spectrum luminance signal; and matrix means for combining said full-spectrum luminance signal with said color signals.

16. Video processing means as set forth in claim 15 wherein said second processor means includes analog-to-digital converting means operated in response to said high frequency clock signal source converting said luminance band signal from an analog signal to a high clock frequency digital signal.

17. For use in an image display system responsive to a composite video signal having luminance information and chrominance information signals and having a source of high frequency clock signals and low frequency clock signals, a video processing method comprising the steps of:

receiving said composite video signal;

frequency dividing said composite video signal into a chrominance band signal and a luminance band signal;

processing said chrominance band signal to produce high frequency clocked luminance information and chrominance information within said chrominance band;

processing said luminance band signal to produce a low frequency portion digital signal having a clock rate equal to said source of low frequency clock signals and a high frequency portion digital signal having a clock rate equal to said source of high frequency clock signals;

delaying said low frequency portion digital signal of said luminance band signal to produce a delayed low frequency portion digital signal;

processing said delayed low frequency portion digital signal to provide a delayed low frequency portion digital signal having said high frequency clock rate;

combining said luminance information within said chrominance band signal, said delayed low frequency portion digital signal having a clock rate equal to said source of high frequency clock signal and said high frequency portion digital signal to form a full spectrum luminance signal.

* * * * *